United States Patent Office 2,936,321
Patented May 10, 1960

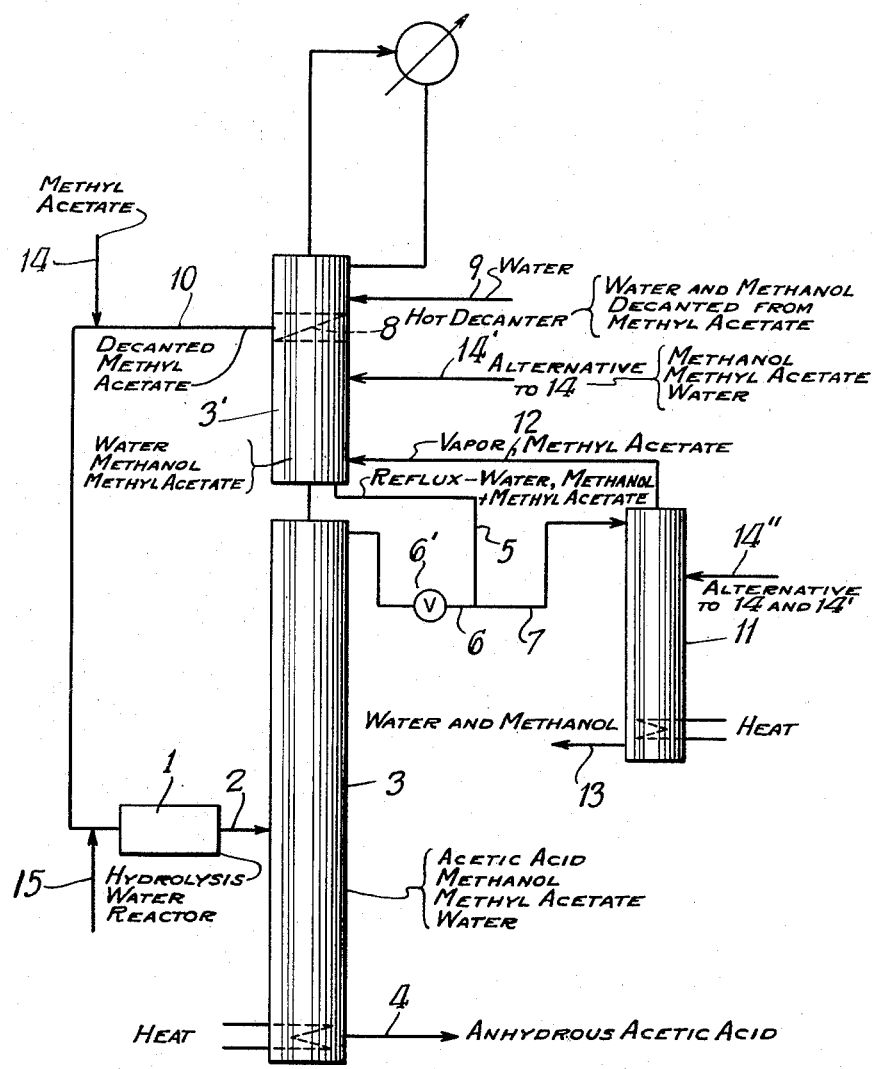

2,936,321

PROCESS FOR HYDROLYZING LOWER ALIPHATIC ESTERS AND SEPARATION OF RESULTING PRODUCTS

Jules Mercier, Melle, France, assignor to Les Usines de Melle (Societe Anonyme), Saint-Leger-les-Melle, France, a corporation of France Application February 20, 1958, Serial No. 716,330

Claims priority, application France February 26, 1957

5 Claims. (Cl. 260—541)

This invention relates to a process for hydrolyzing lower aliphatic esters and the separation of the resulting products. More particularly it is concerned with the hydrolysis of methyl acetate and separation of the hydrolysis products from one another.

The principal object of the invention is to provide a simple, efficient process for hydrolyzing said esters which may be carried out with much greater efficiency and in simpler and less expensive apparatus than that of prior processes.

This invention accordingly comprises the novel processes and steps of processes, specific embodiments of which are described hereinafter by way of example, and in accordance with which I now prefer to practice the invention.

One of the lower aliphatic esters which may be treated by the present process is methyl acetate, which is a by-product of the manufacture of polyvinyl alcohol. Hydrolysis of methyl acetate can be carried out by heating a mixture of methyl acetate and water in the presence of an acid catalyst which may be an inorganic acid soluble in the reaction mixture, or an insoluble catalyst which may be a cation-exchange resin in its hydrogen form. The hydrolysis reaction produces an equilibrium mixture the composition of which depends on the molar proportion of the reactants water and ester, time and temperature. The equilibrium mixture comprises the four substances acetate, water, alcohol and acid.

In accordance with prior proposals this mixture has been distilled and two groups of products obtained separately. From the head of the distillation column an acetate-alcohol mixture was obtained containing a small amount of water, and free from acid. From the base of the column there was obtained the whole of the acetic acid, substantially all of the water, and the inorganic acid catalyst, if any.

It was necessary to separate the mixture at the head of the column into ester and alcohol which could be performed in accordance with United States Patent No. 2,650,249. This process required distilling the ester-alcohol mixture in two columns, in the head of the first of which alcohol-free water-saturated methyl acetate was obtained and recycled to the hydrolysis step; and from the base of the column an ester free aqueous methanol solution was obtained which had to be distilled in the second column for separating pure methanol from water.

The aqueous solution of acetic acid obtained from the base of the original column according to prior proposals was also treated for recovery of pure acetic acid by one of three methods, as follows:

(a) Solvent extraction of the acetic acid. This method is used in the aforementioned patent.

(b) Direct distillation of the acid solution, without previous extraction, in the presence of a water entrainer forming with water an azeotropic mixture.

(c) Simple, direct distillation of the acid solution, separating water at the head of the column and pure acid at the base thereof.

The latter two methods cannot be applied where the hydrolysis catalyst is an inorganic acid because the catalyst would contaminate the obtained acetic acid and attack the distilling column, unless the acid solution is previously neutralized, but in this case the inorganic acid salt would contaminate the acetic acid. These methods, however, can be applied where an ion exchanger is employed as a hydrolysis catalyst.

It is evident that the dehydration of the acetic acid by either of the last-named two methods is the more economical, the higher the concentration of the acetic acid solution is. Accordingly, it is advisable to so regulate the hydrolysis reaction conditions that conversion of the water by hydrolysis of the ester be as high as possible, thus producing a mixture in which the ratio, water/ester, is low.

Under such operating conditions, however, the rate of conversion of the ester will be low, thus high amounts of unconverted ester will have to be recycled, this implying high heat expense in the ester-alcohol separating column.

Experiments made by me show that the lowest heat expense occurs when the weight ratio, water/ester, is approximately 20/80, this ratio producing an acetic acid aqueous solution containing about 60% by weight of acetic acid. The heat expense by the prior process then amounts to about 4.2 kg. of steam per kg. of hydrolyzed ester.

I have found in accordance with my invention that the economy of the above process may be greatly improved and the apparatus required may be greatly simplified.

In carrying out my invention I hydrolyze a lower alkyl ester such as methyl acetate, but without limitation, containing not over 6 carbon atoms in the molecule with water and a solid hydrolysis catalyst to produce a mixture of acid, lower alkyl alcohol, the ester and water. I then distill this mixture in a single column, separating at the top of the column the lower alkyl ester from water and alcohol by extractive water distillation. In this distillation I preferably introduce the water above a hot decanter in the column to effect the separation mentioned. The ester thus separated is substantially pure, and the aqueous alkyl alcohol, such as methanol separated contains a minor proportion of the ester. Substantially pure acid is withdrawn from the base of the column.

In hydrolyzing methyl acetate, for example, I hydrolyze preferably a mixture containing 80–95% by weight of methyl acetate and 20–5% by weight of water, and the hydrolysis is carried out at a temperature of 60–100° C. for approximately 10–100 minutes. The catalyst employed in the hydrolysis is a cation exchange resin in its hydrogen form, and is preferably a sulfonic polystyrene resin.

In carrying out the process I preferably feed to the hydrolysis step the alkyl ester separated at the top of the column along with the original feed of the ester. Where methyl acetate is the starting material it may contain some methanol. Instead of hydrolyzing this mixture I feed it either to the extractive distillation zone or to the aqueous methanol distillation zone. Then upon separation of the acetate from the alcohol I feed this to the hydrolysis zone.

I have found, in accordance with my invention, that by providing a suitable distilling column and providing particular conditions for hydrolysis, it is possible to lower the total heat expense materially below the minimum value mentioned above, namely about 4.2 kg. of steam per kg. of hydrolyzed ester. As a matter of fact, my new method allows the heat expense to be as low as about 3.6 kg. of steam per kg. of hydrolyzed ester, this figure representing an economy of more than 14%. In addition, my new method considerably simplifies the apparatus, enabling in particular the unit for acetic acid dehydration to be dispensed with. The inconveniences resulting from the use of a solvent for extraction of the acetic acid are also avoided.

The following description with reference to the annexed drawing will show how the process of my invention may be carried out in the hydrolysis of methyl acetate. The drawing illustrates diagrammatically a plant operating in accordance with the present invention.

Hydrolysis reaction takes place in reactor 1 to which the ester is fed by pipe 14 and water by pipe 15. The reaction temperature is in the range 60–100° C., and the contact time in the range 10–100 minutes. The reaction mixture from reactor 1 is introduced by pipe 2 into section 3 of a distilling column 3—3' to the base of which there is supplied sufficient heat to obtain pure, anhydrous acetic acid from said base by pipe 4.

All the vapors leaving the top of section 3 and consisting of water, methanol and methyl acetate are fed to the bottom of section 3', the reflux of which flows off by pipe 5 and is divided into two portions, of which one is refluxed to the top of section 3 by a pipe 6 fitted with a cock 6' while the other is introduced into a column 11 by a pipe 7.

Section 3' is fitted with a conventional hot decanting device, preferably an internal decanting plate 8 from which the methyl acetate is withdrawn and recycled to reactor 1 by pipe 10. Water is introduced into column 3—3' at a level above that of the hot decanting device through pipe 9.

Owing to the reflux to section 3 by pipe 5 and pipe 6, the acetic acid is driven back down to the base of section 3 and therefore is not present in the vapors entering section 3' or in the reflux thereof.

Finally, the water and methanol are withdrawn through pipe 13 from the base of column 11 which is so heated as to return to section 3' by pipe 12 the methyl acetate in vapor state which was present in liquid state in the mixture introduced by pipe 7.

Owing to this arrangement the heat supplied to the base of section 3 provides for both concentration of the acetic acid in the said base and recovery from its top of acid-free, lower boiling products. Then, the same heat acts in section 3' to separate the ester from the alcohol without it being necessary to provide further heat supply therefor.

Thus, the heat required for concentrating the acetic acid is sufficient for ensuring, in addition, separation of the methyl acetate from the methanol. Finally the heat expense is accordingly materially lowered as compared with the prior process wherein separate columns are employed.

It should be emphasized that the reflux through pipe 5 contains methyl acetate and methanol besides water, which mixture prevents acetic acid vapors passing into 3'. Accordingly the heat expense for obtaining at the top of section 3 acetic acid-free vapors is less than it would be if the reflux to the top of section 3 consisted of pure water.

Of course the heat expense required for this separation may vary, depending upon the composition of the reaction mixture to be distilled. It has been found that the lowest heat expense is realized for the following conditions of the hydrolysis reaction:

Weight proportion of the starting ester/water mixture _____ 85/15
Ester conversion _____ 21%

Under these conditions ahe actic acid concentration in the reaction mixture from the reactor is approximately 60%. The starting mixture is heterogeneous, but it has been observed that this fact does not interfere with the hydrolysis reaction which can be performed at a normal speed, provided that the reactor is suitably shaped.

Such a reactor is described in the copending application of Alheritiere and Mercier, Serial No. 720,358, filed March 10, 1958. Said Mercier is the applicant herein.

Such reactor comprises a reaction vessel the inner cross-section of which increases from bottom to top. It is preferably an inverted cone-shaped or frustum-shaped vessel containing particles of the solid catalyst. The vessel contains means for admitting the materials for hydrolysis which pass upwardly through the catalyst bed of sulfonic polystyrene resin or other solid catalyst, as herein mentioned.

In practice the ester/water weight proportion in the feed to the reactor is so controlled as to be in the range 80/20–95/5, preferably about 85/15.

Furthermore, for avoiding the inconveniences resulting from the presence of an inorganic acid catalyst or the salts produced by its neutralization the hydrolysis in the reactor is performed in the presence of an ion exchange resin catalyst in its hydrogen form. Any such cation exchangers may be used, the preferred ones however being sulfonic polystyrene resins.

The problem of hydrolyzing methyl acetate arises in particular in polyvinyl alcohol manufacture. The raw starting material in this case is a mixture of methyl acetate, methanol and water. Preliminary separation of the methanol before the hydrolysis step is recommended, otherwise the conversion of the ester would be too low.

In this case, accordingly, the raw starting mixture, instead of being directly introduced into reactor 1 by pipe 14 (as is the case where substantially pure or no methanol-containing methyl acetate is used as a starting material), is introduced by a pipe 14' into section 3' of distilling column 3—3' in which the methyl acetate is separated from the methanol, then is sent to reactor 1 by pipe 10.

In the particular case where the raw starting mixture is very rich in methanol (for example, containing 80% or 90% or more of methanol), it is undesirable that such high amount of methanol be introduced into section 3' because it would interfere with dehydration of the acetic acid in section 3. In this particular case, accordingly, the raw starting mixture is preferably introduced into the head portion of column 11 by a pipe 14".

In the particular case where the raw starting mixture contains solid substances dissolved or suspended therein, such as low molecular weight polyvinyl alcohols, it is recommended to previously subject it to a preliminary vaporization in the presence of water. The vapors or the condensate of the vapors from this previous vaporization are then fed to the apparatus by 14, 14' or 14", depending on the composition thereof.

Though the foregoing disclosures relates to methyl acetate hydrolysis, this process can be applied successfully to the case of hydrolysis of other lower aliphatic esters, more particularly ethyl acetate and isopropyl acetate. For each particular case the hydrolysis conditions leading to the minimum heat expense for the separation of the products may be determined, but the essential principle of this invention, namely the use of a distillation column comprising two sections arranged and operated as described above, remains the same.

For the sake of clarity, sections 3 and 3' have been represented as being distinct from one another, though the conduits joining them make these sections operate as a single column. Accordingly, one does not depart from the spirit of this invention by directly superimposing section 3' on to section 3, thus making them a single column. The unit constituted by section 3 and section 3', or else the column formed by uniting them into a single frame is a functionally single column. It is referred to in the appended claims as a single column.

I claim:

1. A continuous process which comprises hydrolyzing an ester of a lower alkanoic acid and a lower alkanol, said ester containing no more than a total of six carbon atoms in its molecule, in the presence of water and a cation-exchange resin in its hydrogen form as a catalyst to produce a mixture of said acid, said alkanol, said ester and water, continuously distilling the mixture in a single column, continuously separating at the top of the column said ester from water and alkanol by extractive water distillation, said water and alkanol as separated containing a minor proportion of said ester, continuously distilling the aqueous alkanol to separate the ester as a head product and returning same to the extractive distillation zone while recovering ester-free, aqueous alkanol, and withdrawing substantially pure alkanoic acid from the base of the column.

2. A continuous process which comprises continuously hydrolyzing methyl acetate in the presence of water and a cation-exchange resin in its hydrogen form as a catalyst to produce a mixture of acetic acid, methanol, methyl acetate and water, continuously distilling the mixture in a single column, continuously separating at the top of the column methyl acetate from water and methanol by extractive water distillation and hot decantation, said water and methanol as separated containing a minor proportion of methyl acetate, continuously distilling the aqueous methanol to separate as a head product the methyl acetate, and returning same to the extractive distillation zone while recovering ester-free, aqueous methanol, and withdrawing substantially pure acetic acid from the base of the column.

3. A process in accordance with claim 2, in which the methyl acetate to be hydrolyzed contains some methanol and prior to hydrolysis such methanol is removed in the step of extractive water distillation.

4. A process in accordance with claim 2, in which the methyl acetate to be hydrolyzed contains a large proportion of methanol and prior to hydrolysis such methanol is removed in the step of distilling the aqueous methanol.

5. A continuous process which comprises continuously hydrolyzing methyl acetate in the presence of water and a cation-exchange resin in its hydrogen form as a catalyst, said methyl acetate and water being in the proportion of 80–95% by weight of said acetate and 20–5% by weight of water, to produce a mixture of acetic acid, methanol, methyl acetate and water, said hydrolysis being carried out at a temperature of 60–100° C. with a contact time in the range of 10–100 minutes, continuously distilling the mixture in a single column, continuously separating at the top of the column methyl acetate from water and methanol by extractive water distillation and hot decantation, said water and methanol as separated containing a minor proportion of methyl acetate continuously distilling the aqueous methanol to separate as a head product the methyl acetate, and returning same to the extractive distillation zone while recovering ester-free, aqueous methanol, and withdrawing substantially pure acetic acid from the base of the column.

References Cited in the file of this patent

UNITED STATES PATENTS

| 2,391,219 | Bartlett | Dec. 18, 1945 |
| 2,650,249 | Mention et al. | Aug. 25, 1953 |
| 2,865,955 | Ascherl et al. | Dec. 23, 1958 |
| 2,866,820 | Anselm et al. | Dec. 30, 1958 |

OTHER REFERENCES

Sussman: Ind. Eng. Chem. 38, 1228–1230 (1946).
Bernhard et al.: J. Am. Chem. Soc. 75, 5834–5835 (1953).